Patented Nov. 2, 1948

2,452,653

UNITED STATES PATENT OFFICE 2,452,653

2-ALKYLIDENE-3-KETO-4-ACYLAMIDO-TETRAHYDROTHIOPHENE

Stanton A. Harris, Westfield, and Karl Folkers, Plainfield, N. J., assignors to Merck & Co., Inc., Rahway, N. J., a corporation of New Jersey No Drawing. Application September 16, 1944, Serial No. 554,452

20 Claims. (Cl. 260—329)

This invention is concerned generally with novel chemical compounds and processes of preparing the same; more particularly it relates to novel compounds useful as intermediates in synthesis of the growth-promoting factor, biotin.

Biotin is known to be one of the isomers of the chemical compound 2-(4'-carboxy-butyl)-3:4-ureido-tetrahydrothiophene, having the empirical formula $C_{10}H_{16}O_3N_2S$, and the structural formula:

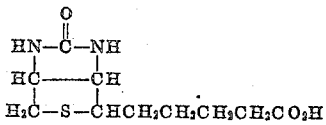

It is now found that this compound can be synthesized by reactions indicated as follows:

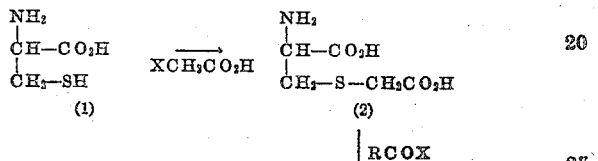

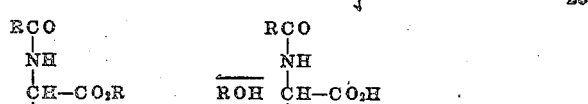

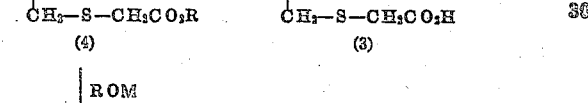

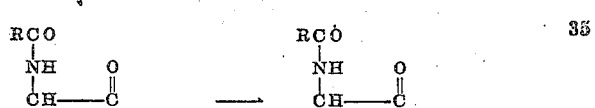

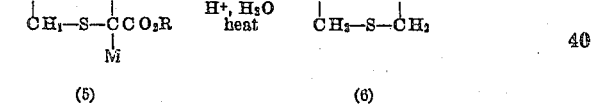

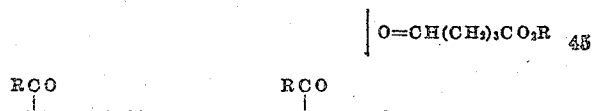

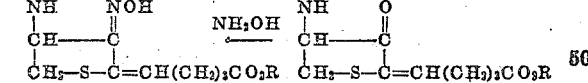

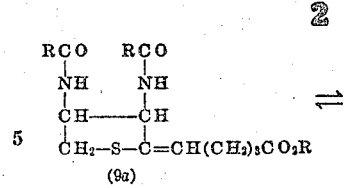

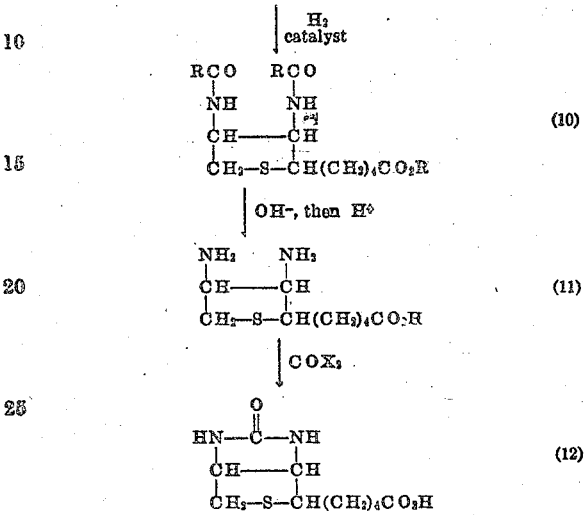

In the above formulae, R represents an alkyl, aryl or arylalkyl group; X, a halogen; and M an alkali metal or an alkaline earth metal.

The reactions above indicated are conducted as follows: 2-amino-3-mercapto-propanoic acid (1) and chloroethanoic acid are condensed in an alkaline aqueous solution to form 2-amino-3-carboxymethylmercapto-propanoic acid (2); which is then treated with an acylating agent, such as an acyl halide, in an aqueous alkaline solution to yield 2-acylamido-3-carboxymethylmercapto-propanoic acid (3). This product is esterified using a mineral acid catalyst to produce the diester (4) of the acid (3), and the diester is treated with alkali metal alcoholate or an alkaline earth metal alcoholate to yield the 2-alkali metal or the 2-alkaline earth metal derivative of an ester of 2-carboxy-3-keto-4-acylamido-tetrahydrothiophene (5). This compound, when heated with a dilute mineral acid, is hydrolyzed and decarboxylated to produce 3-keto-4-acylamido-tetrahydrothiophene (6) which, when reacted with 4-carboxy-butanal ester in a lower aliphatic alcohol reaction medium containing piperidine and a lower aliphatic carboxylic acid, produces 2-(4'-carboalkoxy-butylidene)-3-keto-4-acylamido-tetrahydrothiophene (7). This product, when reacted with hydroxylamine yields an ester of the corresponding oxime, 2-(4'-carboxy-butylidene)-3-isonitroso-4-acylamido-tetrahydrothiophene (8) which upon treatment with a mixture of zinc, a lower aliphatic acid and a lower aliphatic acid anhydride, produces an equilibrium mixture of 2-(4'-carboxy-butylidene)-3:4-di(acylamido)-tetrahydrothiophene ester (9a) and 2-(4'-carboxy-butyl)-3:4-di(acylamido)-4:5-dihydrothiophene ester (9b). This equilibrium mixture, or if preferred, one of the equilibrants, is then treated with hydrogen in the presence of a hydrogenation catalyst to yield 2-(4'-carboxybutyl)-3:4-di(acylamido)-tetrahydrothiophene ester (10). When this last mentioned compound is treated with an aqueous alkaline solution, hydrolysis of the acyl groups occurs, yielding upon acidification, 2-(4'-carboxy-butyl)-3:4-diaminotetrahydrothiophene (11) which, when reacted with a carbonyl halide, produces the compound 2-(4'-carboxy-butyl)-3:4-ureido-tetrahydrothiophene. This product is obtained as a mixture of stereoisomers, one of which is racemic biotin, from which upon resolution, is obtained the dextrorotatory isomer, biotin.

This invention is concerned with the novel class of compounds of which intermediate 7 above is a member, namely the 2-alkylidene-3-keto-4-acylamido-tetrahydrothiophenes, particularly the class of such compounds wherein the 2-alkylidine substituent is an omega-carboxy, omega-carboalkoxy, omega-carboaryloxy, or an omega-carboarylalkoxy-alkylidine. Members of this last mentioned class of compounds are represented by the general formula:

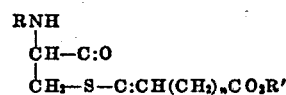

wherein R is an acyl group, R' is of the class consisting of alkyl, aryl and arylalkyl groups, and $n$ is a small integer. In the general class of 2-alkylidene compounds, the 2-substituent in this formula is $C_nH_{2n}$.

According to the present invention, compounds of the class represented by the above general formula are prepared by a process indicated as follows:

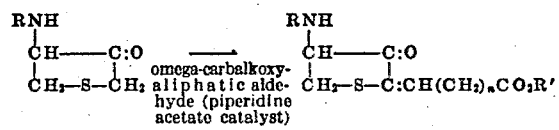

wherein R, R' and $n$ have the meaning assigned above. It is presently preferred to conduct the reaction at about room temperature (30° C.) under essentially neutral conditions and using a substantially inert organic solvent such as alcohol as a reaction medium.

The starting material, 3-keto-4-acylamido-tetrahydrothiophene can be prepared as indicated above and as described in detail in concurrently filed applications, Serial Nos. 554,449, 554,450, 554,451, 554,458; the reaction product, when $n$ is 3, namely 2-(4'-carboalkoxy-butylidene)-3-keto-4-acylamido-tetrahydrothiophene, is an intermediate useful in synthesis of biotin as indicated above and as described in detail in concurrently filed applications, Serial Nos. 554,453, 554,454, 554,455, 554,456 and 554,457. The starting material omega-carboxy-aliphatic aldehyde can be prepared by treating a selected aliphatic dicarboxylic acid with an alkylating agent to form a mono-ester, reacting the unesterified carboxyl group with a thionyl halide and catalytically reducing the product by the Rosenmund reaction to obtain the desired omega-carboxy aldehyde.

For example, 4-carbomethoxy-butyral-1 is prepared as follows. A mixture of about 412 g. of 1:3-dicarboxy-propane and 237 g. of methanol is heated about 2 hours on a steam bath, and the half-ester (B. P. 158–165° C./23 mm.) is removed by fractionation and reacted with about 400 g. of thionyl chloride, the mixture being heated on the steam bath to complete the reaction. The mixture is fractionated and a fraction boiling at 110–113° C. under 23 mm. pressure is collected. About 330 g. of this fraction in 1200 cc. of xylene is hydrogenated under reflux in a closed vessel, using a palladium on barium sulfate catalyst, until evolution of hydrogen chloride ceases. The mixture is then cooled to room temperature, filtered, the solvent is removed under reduced pressure and the residue is fractionated at reduced pressure, the 4-carbomethoxy-butyral-1 being collected in the fraction boiling at 100–103° C. under 23 mm. pressure. Analogous compounds are prepared in like manner.

Among the 3-keto-4-acylamido-tetrahydrothiophenes which can be utilized in the process according to this invention are those wherein the acyl group is acetyl, propionyl and benzoyl; among the aldehydes which can be used are those represented by the general formula $$R(CH_2)_n CHO$$

wherein R is hydrogen, carboxy, carboalkoxy, carboaroxy, carboarylalkoxy or a group other than an aldehyde group readily converted to carboxy; and $n$ is a small integer not exceeding 10.

The following examples illustrates methods of carrying out the present invention, but it is to be understood that these examples are given by way of illustration and not of limitation.

*Example 1*

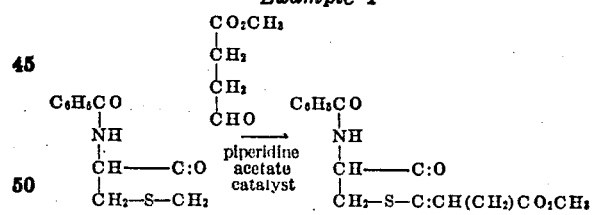

To a solution of about 22 g. of 3-keto-4-benzamido-tetrahydrothiophene in 200 cc. of ethanol is added about 13 g. of 3-carbomethoxy-propanal-1 and, as a catalyst, about 1.5 cc. of piperidine and about 0.9 cc. of acetic acid (glacial). The reaction mixture is allowed to stand at room temperature for about four hours, small amounts of piperidine being added from time to time to maintain the solution substantially neutral. The solution is then cooled and precipitated 2-(3'-carbomethoxy-propylidene)-3-keto-4-benzamido-tetrahydrothiophene (M. P. 141–143° C.) is recovered and purified by recrystallization from ethanol.

*Example 2*

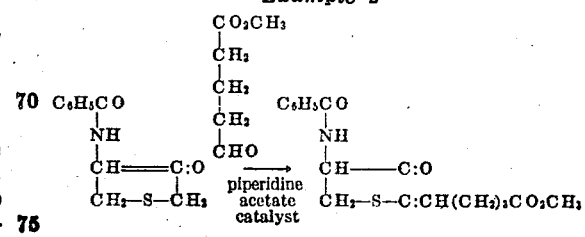

To a solution of about 22.04 g. of 3-keto-4-benzamido-tetrahydrothiophene in 275 cc. of absolute ethanol is added 2 cc. of piperidine, 2.5 cc. of acetic acid (glacial), and about 14.3 cc. of 4-carbomethoxy-butanal-1. After allowing the solution to stand for about 4 hours at room temperature, it is cooled causing precipitation of 2 - (4'-carbomethoxy-butylidene)-3-keto-4-benzamido-tetrahydrothiophene (M. P. 116° C.) which is recovered by filtration. When this product is heated with dilute mineral acid the carbomethoxy group is converted to a carboxyl group, yielding the free acids (M. P. 152–4° C.). Upon treatment of 2-(4'-carbomethoxy-butylidene)-3-keto-4-benzamido-tetrahydrothiophene with p-nitrophenyl hydrazine the corresponding p-nitrophenylhydrazone (M. P. 154–6° C.) is obtained and similarly treatment with .2:4-dinitrophenylhydrazine yields the .2:4-dinitrophenylhydrazone (M. P. 181–185° C.).

Example 3

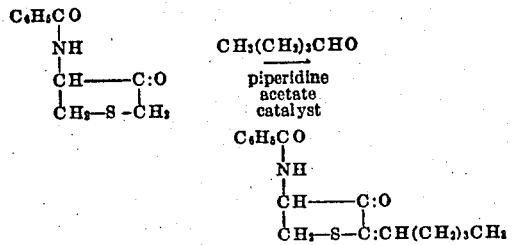

To a solution of 1.1 g. of 3-keto-4-benzamido-tetrahydrothiophene in 20 cc. of aqueous methanol solution is added 0.55 g. of valeraldehyde, 0.1 cc. of piperidine and substantially sufficient acetic acid to neutralize the piperidine. The solution is warmed to about 40–50° C., cooled, and the precipitated 2-pentylidene-3-keto-4-benzamido-tetrahydrothiophene (M. P. 139–140° C.) is removed by filtration.

Example 4

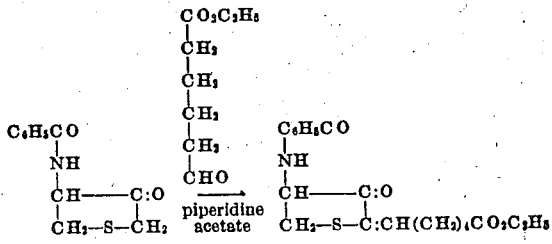

To a solution of about 17 g. of 3-keto-4-benzamido-tetrahydrothiophene in 157 cc. of absolute ethanol is added about 11 g. of 5-carboethoxy-pentanol-1, and 3 cc. of piperidine and 1.8 cc. of acetic acid (glacial) as a catalyst. The solution is allowed to stand at room temperature for about four hours, small quantities of piperidine being added from time to time to maintain the neutrality of the solution. The solution is then cooled, filtered and concentrated. In cooling this concentrate, the 2-(5'-carboethoxy-pentylidene)-3-keto-4-benzamido-tetrahydrothiophene (M. P. 118–119° C.) which separates is recovered by filtration and recrystallized from ethanol.

In like manner similar compounds having acylamido substituents different from the benzamido group can be condensed with aliphatic aldehydes to yield corresponding products, for example, 3-keto-4-acetylamido-tetrahydrothiophene can be condensed with 4-carbomethoxy-butanal-1 to obtain 2-(4'-carbomethoxy-butylidene)-3-keto-4-acetylamido-tetrahydrothiophene.

It also will be apparent to those versed in this art that the above described condensation reaction can be applied to other esters of the selected aldehydes, including both lower and higher alkyl, aryl or aralkyl esters. For example, the condensation of 4-carbophenoxy-butanal-1 and 3-keto-4-benzamido-tetrahydrothiophene yields 2-(4'-carbophenoxy-butylidene) - 3 -keto-4-benzamido-tetrahydrothiophene.

Modifications may be made in carrying out the present invention without departing from the spirit and scope thereof and the invention is to be limited only by the appended claims.

What is claimed is:

1. A compound selected from the class which consists of 3-keto-4-acylamido-tetrahydrothiophenes having a 2-position substituent selected from the class consisting of alkylidene, omega-carboxy-alkylidene, omega-carboalkoxy-alkylidene, omega-carboaroxy-alkylidene and omega-carboaryl-alkoxy-alkylidene 2. A compound represented by the formula:

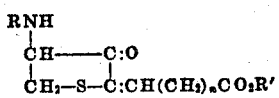

wherein R is an acyl group, R' is an alkyl radical, and $n$ is a small integer.

3. 2-(4'-carbomethoxy - butylidene)-3-keto-4-benzamido-tetrahydrothiophene.

4. The process that comprises reacting an aliphatic aldehyde with a 3-keto-4-acylamido-tetrahydrothiophene, said reaction being carried out under substantially neutral conditions and in the presence of an organic solvent, to produce a 2-alkylidene-3-keto-4 - acylamido - tetrahydrothiophene.

5. The process that comprises reacting an aliphatic aldehyde with a 3-keto-4-acylamido-tetrahydrothiophene, said reaction being carried out in solution in a substantially inert organic solvent under substantially neutral conditions and in the presence of piperidine acetate as a catalyst, to produce a 2-alkylidene-3-keto-4-acylamido-tetrahydrothiophene.

6. The process that comprises reacting an omega-carboalkoxy-aliphatic aldehyde with a 3-keto-4-acylamido-tetrahydrothiophene, said reaction being carried out under substantially neutral conditions and in the presence of an organic solvent, to produce a 2-(omega-carboalkoxy-alkylidene)-3-keto - 4 - acylamido-tetrahydrothiophene.

7. The process that comprises reacting an omega-carboalkoxy-aliphatic aldehyde with a 3-keto-4-acylamido-tetrahydrothiophene, said reaction being carried out in solution in a substantially inert organic solvent under substantially neutral conditions and in the presence of piperidine acetate as a catalyst, to produce a 2-(omega-carboalkoxy-alkylidene) - 3 - keto - 4-acylamido-tetrahydrothiophene.

8. The process that comprises reacting a 4-carboalkoxy-butanal-1 with a 3-keto-4-acylamido-tetrahydrothiophene, said reaction being carried out under substantially neutral conditions and in the presence of an organic solvent, to produce a 2-(4'-carboalkoxy-butylidene)-3-keto-4-acylamido-tetrahydrothiophene.

9. The process that comprises reacting a 4-carboalkoxy-butanal-1 with a 3-keto-4-acylamido-tetrahydrothiophene, said reaction being carried out in solution in a substantially inert organic solvent under substantially neutral conditions and in the presence of piperidine acetate as a catalyst, to produce a 2-(4'-carboalkoxy-butylidene)-3-keto-4-acylamido-tetrahydrothiophene.

10. The process that comprises reacting a 4-carboalkoxy-butanal-1 with 3-keto-4-benzamido-tetrahydrothiophene, said reaction being carried out under substantially neutral conditions and in the presence of an organic solvent, to produce a 2-(4'-carboalkoxy-butylidene)-3-keto-4-benzamido-tetrahydrothiophene.

11. 2-(4'-carboxy-butylidene)-3-keto-4-benzamido tetrahydrothiophene.

12. A compound represented by the formula:

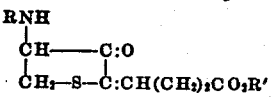

wherein R is an acyl group, and R' is an alkyl radical.

13. A compound represented by the formula:

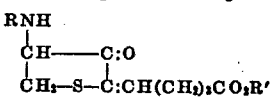

wherein R is an acyl group, and R' is an alkyl radical.

14. A compound represented by the formula:

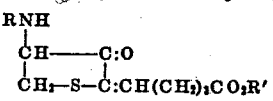

wherein R is an acyl group, and R' is an aryl radical.

15. A compound represented by the formula:

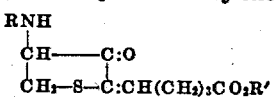

wherein R is an acyl group, and R' is an aralkyl radical.

16. A compound represented by the formula:

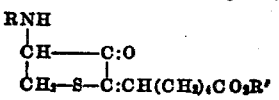

wherein R is an acyl group, and R' is an alkyl radical.

17. A compound represented by the formula:

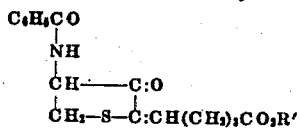

wherein R' is an alkyl radical.

18. The process which comprises reacting 4-carbomethoxy-butanal-1 with 3-keto-4-benzamido-tetrahydrothiophene, said reaction being carried out in solution in a substantially inert organic solvent under substantially neutral conditions and in the presence of piperidine acetate catalyst, to produce 2-(4'-carbomethoxy-butylidene)-3-keto-4-benzamido-tetrahydrothiophene.

19. The process which comprises reacting a 3-carboalkoxy-propanal-1 with a 3-keto-4-acylamido-tetrahydrothiophene, said reaction being carried out in solution in a substantially inert organic solvent under substantially neutral conditions and in the presence of piperidine acetate as a catalyst, to produce the corresponding 2-(3'-carboalkoxy-propylidene)-3-keto-4-acylamido-tetrahydrothiophene.

20. The process which comprises reacting a 5-carboalkoxy-pentanal-1 with a 3-keto-4-acylamido-tetrahydrothiophene, said reaction being carried out in solution in a substantially inert organic solvent under substantially neutral conditions and in the presence of piperidine acetate as a catalyst, to produce the corresponding 2-(5'-carboalkoxy-propylidene)-3-keto-4-acylamido-tetrahydrothiophene.

STANTON A. HARRIS.
KARL FOLKERS.

REFERENCES CITED

The following references are of record in the file of this patent:

UNITED STATES PATENTS

| Number | Name | Date |
|---|---|---|
| 2,228,452 | Gleason | Jan. 14, 1941 |
| 2,336,916 | Arnold | Dec. 14, 1943 |

Certificate of Correction

Patent No. 2,452,653. November 2, 1948.

STANTON A. HARRIS ET AL.

It is hereby certified that errors appear in the printed specification of the above numbered patent requiring correction as follows:

Column 1, Formula (5), extreme lower left hand portion thereof, for

"$CH_1$-S-$CCO_2R$" read $CH_2$-$S$-$CCO_2R$ column 2, Formula (9b), lower right hand portion thereof, for column 3, line 12, for the words "of if" read *or if*; column 4, Example 1, left hand portion thereof, for

same Example 1, right hand portion thereof, for

column 4, Example 2, left hand portion thereof, for "CH===C:O" read *CH——C:O*; same Example 2, right hand portion thereof, for

and that the said Letters Patent should be read with these corrections therein that the same may conform to the record of the case in the Patent Office.

Signed and sealed this 24th day of May, A. D. 1949.

[SEAL]

THOMAS F. MURPHY,
*Assistant Commissioner of Patents.*